United States Patent
Wu et al.

(10) Patent No.: US 9,704,038 B2
(45) Date of Patent: Jul. 11, 2017

(54) EYE TRACKING

(71) Applicant: Microsoft Technology Licensing, LLC, Redmond, WA (US)

(72) Inventors: Dijia Wu, Sammamish, WA (US); Michael J. Conrad, Monroe, WA (US); Chun-Te Chu, Bellevue, WA (US); Geoffrey John Hulten, Lynnwood, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 97 days.

(21) Appl. No.: 14/591,865

(22) Filed: Jan. 7, 2015

(65) Prior Publication Data

US 2016/0196465 A1   Jul. 7, 2016

(51) Int. Cl.
  G06K 9/62   (2006.01)
  G06K 9/00   (2006.01)
  G06F 3/01   (2006.01)
  G06K 9/46   (2006.01)
  G06K 9/52   (2006.01)
  G06T 3/40   (2006.01)

(52) U.S. Cl.
  CPC ............ G06K 9/0061 (2013.01); G06F 3/013 (2013.01); G06K 9/46 (2013.01); G06K 9/4661 (2013.01); G06K 9/52 (2013.01); G06T 3/40 (2013.01); G06K 2009/4666 (2013.01)

(58) Field of Classification Search
  CPC ...... G06K 9/0061; G06K 9/46; G06K 9/4661; G06K 9/52; G06K 2009/4666; G06F 3/013; G06T 3/40

USPC ........ 382/103, 190, 199, 117, 173, 128, 281
  See application file for complete search history.

(56) References Cited

U.S. PATENT DOCUMENTS 6,144,754 A  * 11/2000  Okano ............... G06K 9/00597
                                                   382/117
7,583,823 B2    9/2009  Jones et al.
(Continued)

FOREIGN PATENT DOCUMENTS

CN    100403331 C    3/2007
EP    2657903 A1    10/2013
(Continued)

OTHER PUBLICATIONS

Nixon, M., "Eye Spacing Measurement for Facial Recognition", Applications of Digital Image Processing VIII, SPIE vol. 575, Dec. 19, 1985, 7 pages.
(Continued)

Primary Examiner — Samir Ahmed
(74) Attorney, Agent, or Firm — Alleman Hall Creasman & Tuttle LLP (57) ABSTRACT

Examples are disclosed herein that relate to eye tracking based on two-dimensional image data. One example provides, on a computing device, a method of tracking an eye. The method includes receiving image data from an image sensor, detecting a face of the user in the image data, locating the eye in a region of the face in the image data to obtain an eye image, normalizing one or more of a scale and an illumination of the eye image, fitting an ellipse to an iris of the eye in the eye image, and outputting a determination of an eye gaze direction based upon the ellipse fitted.

15 Claims, 6 Drawing Sheets

(56) References Cited

U.S. PATENT DOCUMENTS

| | | | |
|---|---|---|---|
| 8,098,901 B2 | 1/2012 | Hamza | |
| 8,639,058 B2 | 1/2014 | Bergen et al. | |
| 8,644,562 B2 | 2/2014 | Tosa et al. | |
| 8,649,583 B2 | 2/2014 | Tsukizawa et al. | |
| 8,750,623 B2* | 6/2014 | Ruan | G06T 7/0083 |
| | | | 382/103 |
| 8,805,087 B2* | 8/2014 | Ruan | G06K 9/00597 |
| | | | 382/117 |
| 8,811,657 B2 | 8/2014 | Teiwes et al. | |
| 8,878,749 B1* | 11/2014 | Wu | G01S 17/06 |
| | | | 345/8 |
| 2006/0147094 A1 | 7/2006 | Yoo | |
| 2007/0036397 A1 | 2/2007 | Hamza | |
| 2007/0140531 A1* | 6/2007 | Hamza | G06K 9/00597 |
| | | | 382/117 |
| 2008/0012860 A1* | 1/2008 | Klefenz | G06K 9/0061 |
| | | | 345/441 |
| 2008/0292144 A1 | 11/2008 | Kim | |
| 2010/0142765 A1* | 6/2010 | Hamza | G06K 9/036 |
| | | | 382/117 |
| 2010/0189357 A1* | 7/2010 | Robin | G06T 11/001 |
| | | | 382/195 |
| 2011/0150334 A1* | 6/2011 | Du | G06K 9/00604 |
| | | | 382/173 |
| 2012/0177266 A1* | 7/2012 | Tsukizawa | A61B 3/113 |
| | | | 382/128 |
| 2012/0213418 A1* | 8/2012 | Tosa | G06K 9/00604 |
| | | | 382/117 |
| 2013/0114043 A1* | 5/2013 | Balan | H04N 13/044 |
| | | | 351/210 |
| 2014/0111630 A1* | 4/2014 | R. Pires | A61B 3/113 |
| | | | 348/78 |
| 2014/0161325 A1 | 6/2014 | Bergen | |
| 2014/0218281 A1 | 8/2014 | Amayeh et al. | |

FOREIGN PATENT DOCUMENTS

| | | |
|---|---|---|
| WO | 2009029638 A1 | 3/2009 |
| WO | 2010011785 A1 | 1/2010 |

OTHER PUBLICATIONS

Hansen, D. et al., "In the Eye of the Beholder: A Survey of Models for Eyes and Gaze", In IEEE Transactions on Pattern Analysis and Machine Intelligence, vol. 32, Issue 3, Published online Jan. 23, 2009, Issued Mar. 2010, 26 pages.

Lanata, A. et al., "Eye tracking and pupil size variation as response to affective stimuli: a preliminary study", In 2011 5th International Conference on Pervasive Computing Technologies for Healthcare (PervasiveHealth) and Workshops, May 23, 2011, Dublin, 7 pages.

Rathgeb, C. et al., "Chapter 6: Multi-stage Real-Time Iris Preprocessing", Iris Biometics: From Segmentation to Template Security, Advances in Information Security 59, Available as early as Nov. 8, 2012, 9 pages.

ISA European Patent Office, International Search Report and Written Opinion issued in PCT Application No. PCT/US2015/067753, May 11, 2016, WIPO, 12 pages.

Viola, et al., "Robust Real-Time Face Detection", In International Journal of Computer Vision, vol. 57, Issue 2, May 2004, pp. 137-154.

Cao, et al., "Face Alignment by Explicit Shape Regression", In IEEE Conference on Computer Vision and Pattern Recognition, Jun. 16, 2012, 8 pages.

Ren, et al., "Face Alignment at 3000 FPS via Regressing Local Binary Features", In IEEE Conference on Computer Vision and Pattern Recognition, Jun. 24, 2014, 8 pages.

Li, et al., "Starburst: A hybrid Algorithm for Video-based Eye Tracking Combining Feature-Based and Model-Based Approaches", In IEEE Computer Society Conference on Computer Vision and Pattern Recognition, Jun. 25, 2005, 8 pages.

Loy, et al., "Fast Radial Symmetry for Detecting Points of Interest", In IEEE Transactions on Pattern Analysis and Machine Intelligence, vol. 25, Issue 8, Aug. 2003, pp. 959-973.

Ni, et al., "Fast Radial Symmetry Detection under Affine Transformations", In Proceedings of IEEE Conference on Computer Vision and Pattern Recognition, Jun. 16, 2012, 8 pages.

Tsai, Yao-Hong, "A Weighted Approach to Unconstrained Iris Recognition", In International Journal of Computer, Information, Systems and Control Engineering, vol. 8, No. 1, Sep. 16, 2014, pp. 30-33.

Shah, et al., "Iris Segmentation Using Geodesic Active Contours", In IEEE Transactions on Information Forensics and Security, vol. 4, No. 4, Dec. 2009, pp. 824-836.

Kulkarni, et al., "Analysis of Iris Image Segmentation in a Color Space Model", In International Journal of Engineering and Advanced Technology, vol. 3, Issue 5, Jun. 16, pp. 50-56.

Hilal, et al., "Hough Transform and Active Contour for Enhanced Iris Segmentation", In International Journal of Computer Science Issues, vol. 9, Issue 6, No. 2, Nov. 2012, 10 pages.

Shamsi, et al., "A Novel Approach for Iris Segmentation and Normalization", In Second International Conference on the Applications of Digital Information and Web Technologies, Aug. 4, 2009, pp. 557-562.

IPEA European Patent Office, Second Written Opinion Issued in PCT Application No. PCT/US2015/067753, Nov. 18, 2016, WIPO, 5 pages.

IPEA European Patent Office, International Preliminary Report on Patentability Issued in PCT Application No. PCT/US2015/067753, Feb. 2, 2017, WIPO, 15 pages.

* cited by examiner

EYE TRACKING

BACKGROUND

Eye tracking technologies may be used in electronic devices for many purposes, including but not limited to advertising, marketing research, automotive engineering, usability studies, and natural human-computer interactions. For example, eye tracking may be used for human-computer interactions by determining a location at which a user's gaze intersects a graphical user interface, and using the determined location as a positional signal for interacting with the graphical user interface.

SUMMARY

Examples are disclosed herein that relate to eye tracking based on image data. One example provides, on a computing device, a method including receiving image data from an image sensor, detecting a face of the user in the image data, locating the eye in a region of the face in the image data to obtain an eye image, normalizing one or more of a scale and an illumination of the eye image, fitting an ellipse to an iris of the eye in the eye image, and outputting a determination of an eye gaze direction based upon the ellipse fitted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many eye tracking methods may utilize image data to detect a location of a pupil relative to locations of corneal reflections, or glints, of light from known light sources. However, such eye tracking techniques may consume more power than desired for a mobile battery-powered device due to the use of the light sources. Further, image-based eye tracking methods may utilize machine learning techniques that involve expensive training data collection.

Accordingly, examples are disclosed herein that relate to image-based eye tracking that may operate without the use of glint light sources. The disclosed examples may allow eye tracking to be performed with ordinary visible light cameras. This may allow eye tracking to be implemented using image sensors widely available on current devices. Further, the omission of glint light sources may help to save power, and thus extend battery life and time between charges.

Figure 1:
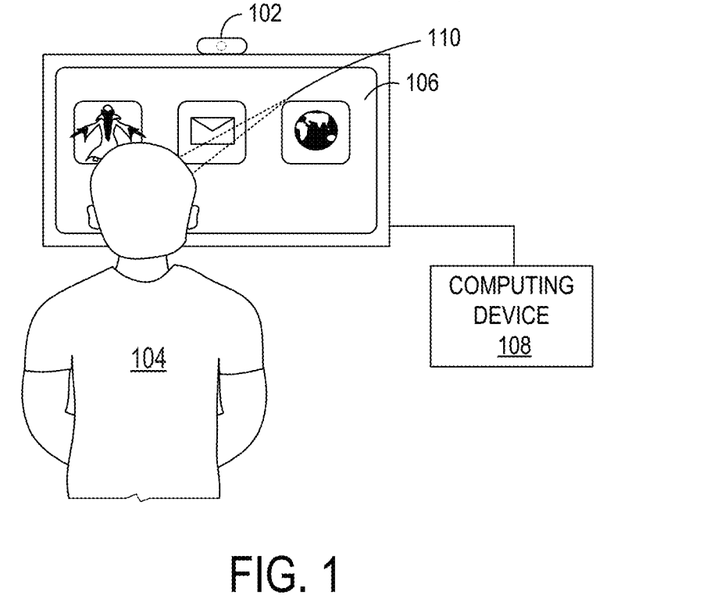
FIG. 1 shows an example eye tracking system for a computing device.

FIG. 1 shows an example eye tracking system 100. Eye tracking system 100 comprises an image sensor 102 used to acquire images of a user 104 viewing a display 106 of a computing device 108. Eye tracking system 100 may be used to determine a location 110 at which a gaze of user 104 intersects display 106. Location 108 thus may be used as a position signal for interacting with a graphical user interface displayed on display 106. While depicted in the context of a larger format display (e.g. a monitor or television), it will be understood that the disclosed examples may be used with any suitable computing device, including but not limited to mobile devices, wearable devices, etc.

Figure 2:
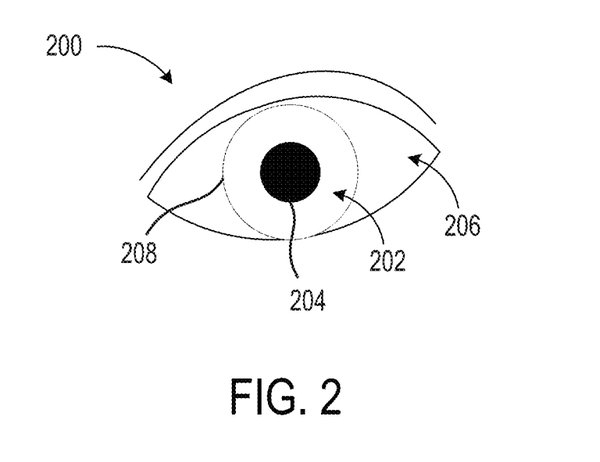
FIG. 2 illustrates various structures of an eye.

As explained in more detail below, eye tracking system 100 may be configured to identify structures of an eye to help determine a gaze direction of the eye. FIG. 2 shows a simplified depiction of an eye 200, and illustrates various eye structures, including an iris 202 (the colored muscle group that controls a diameter of the pupil), a pupil 204 (the aperture that allows light into the eye), and a sclera 206 (the white protective tissue that covers the remainder of the eye). Eye tracking system 100 may track user's eye 200, for example, by locating iris 202 and/or pupil 204 of the eye 200 with visible image data. These structures may be located in image data in any suitable manner. For example, some examples that utilize a visible light camera may detect the elliptical contour between the iris and the sclera known as the limbus (208 in FIG. 2), as the sclera strongly reflects visible light. In contrast, where infrared image data is used, the pupil may be more easily detected, as both the sclera and the iris strongly reflect infrared light while the pupil does not. While described herein primarily in the context of two-dimensional visible images, it will be understood that the examples disclosed herein may be used to track gaze from two-dimensional infrared images, infrared or visible depth images, and/or any other suitable types of image data.

Figure 3:
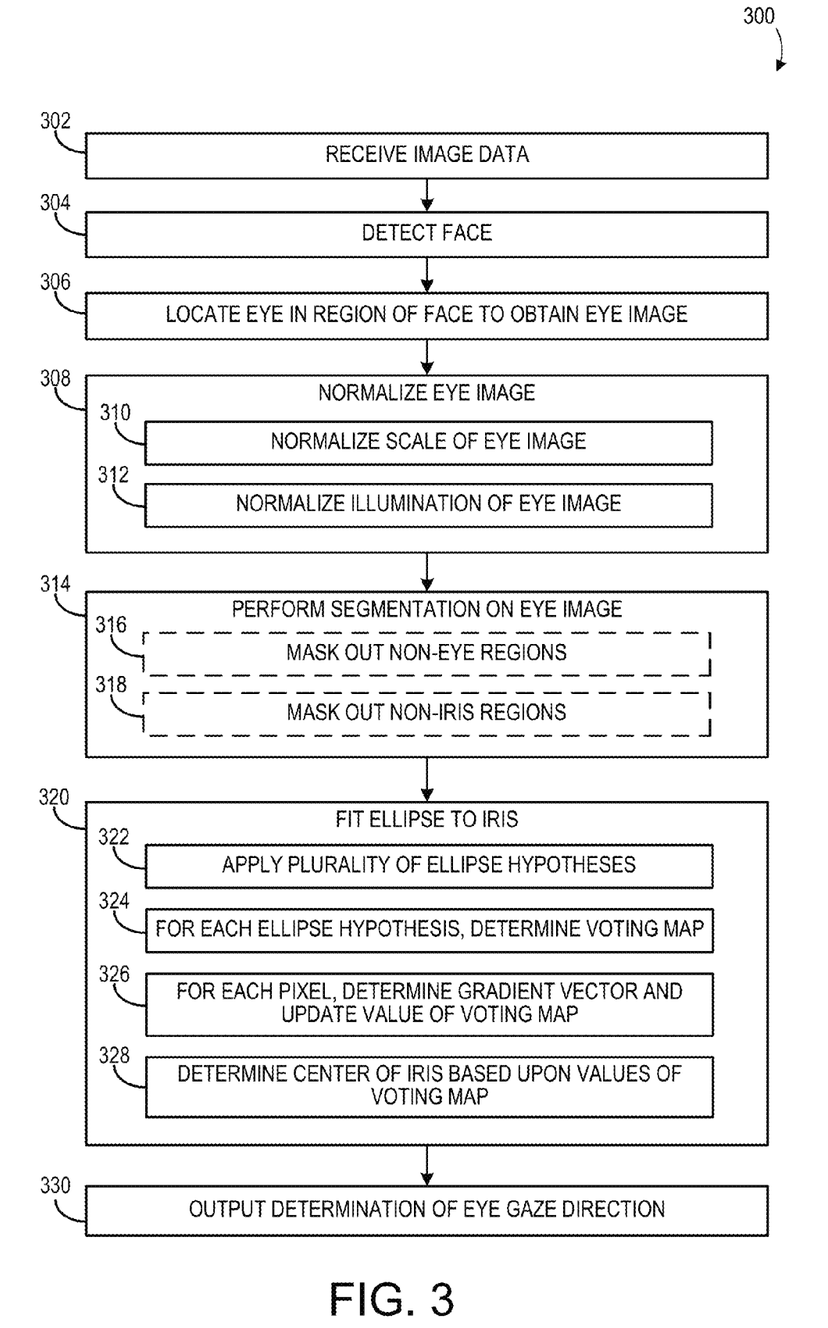
FIG. 3 shows a flow diagram depicting an example eye tracking method.
Figure 4:
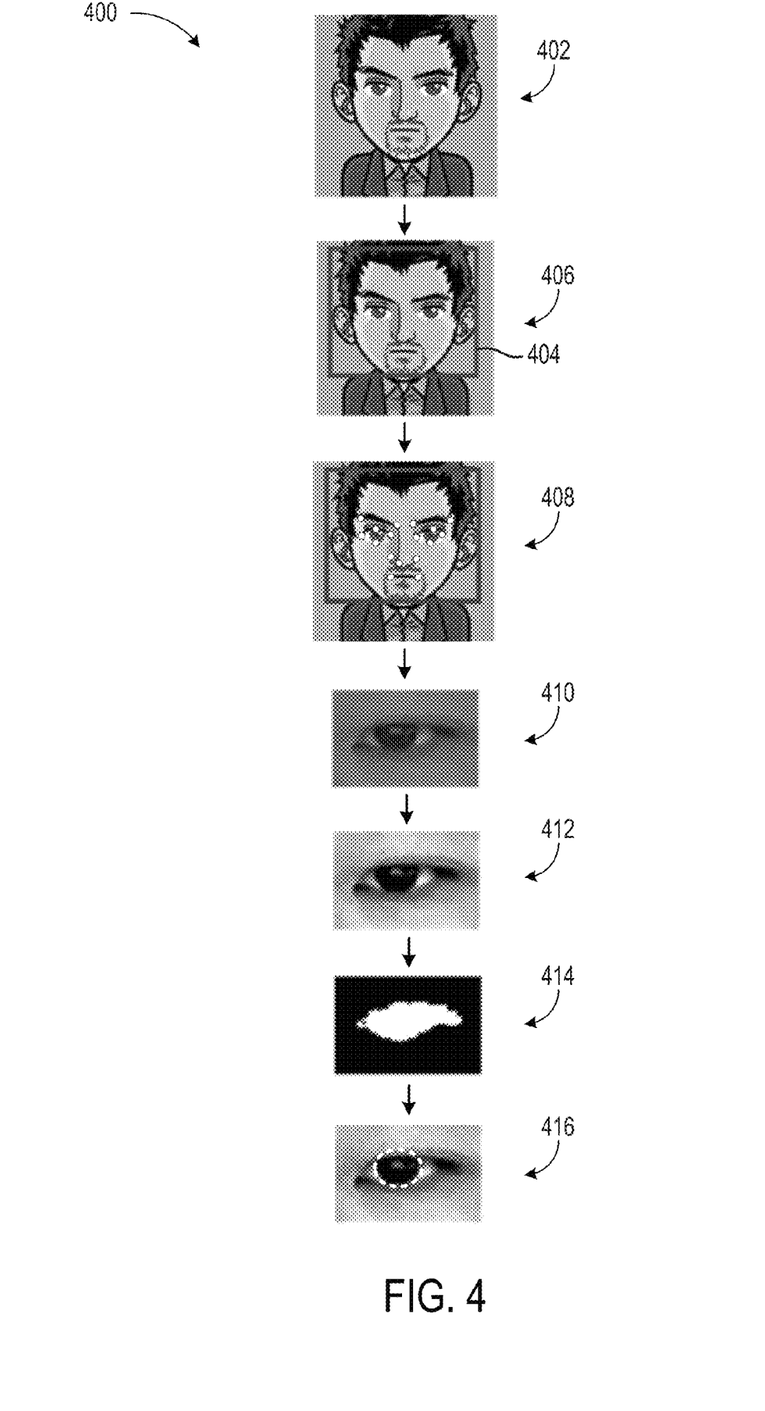
FIG. 4 shows a schematic depiction of example images at various stages of the eye tracking method of FIG. 3.

FIG. 3 shows a flow diagram illustrating an example method 300 of eye tracking, and FIG. 4 illustrates image data at various stages of method 300. Method 300 comprises, at 302, receiving image data acquired by an image sensor, and, at 304, detecting a face of a user within the image data. Referring to FIG. 4, image 402 represents an image acquired by an image sensor. Face detection methods may be used to process image 402 to define a box area 404 that includes the face of the user, as shown in image 406. Any suitable face detection method may be used, including but not limited to methods based on cascading classifiers.

Continuing with FIG. 3, method 300 further comprises, at 306, locating an eye in a region of the face to obtain an eye image. Any suitable method may be used to locate the eye in the face region of the image. For example, again referring to FIG. 4, once the box area 404 of the face is obtained, face alignment may be performed, as illustrated at 408, to locate facial landmarks including the eyes, nose, mouth, etc. Face alignment also may be used to locate eye corners and eye centers. The identification of such features may be used to crop out an eye image 410 from the face image, which may help to reduce a size of a search region for locating the iris, and thereby to improve detection speed. Face alignment may be performed using shape regression-based methods, or any other suitable methods.

In light of factors such as variable distances of the user to the image sensor(s) and resolution discrepancies among different image sensors, a number of pixels across the eye in each image may vary. Thus, method 300 may comprise, at 310, normalizing a scale of the eye image. Normalization of the scale of the eye may facilitate the detection of eye structures in later processing steps. In some examples, scale normalization may first be performed on the face image prior to cropping out and scaling the eye image. As one non-limiting example, a face image may be normalized in scale such that a distance between the two eye centers obtained from face alignment is set to 200 pixels. Then, a scale-normalized eye image 410 may be obtained by cropping an area having a width of 120 pixels and a height of 80 pixels centered at a detected eye center. Additionally or alternatively, a distance between the inner and outer corner of a single eye, and/or between any other suitable face landmarks, may be normalized. It will be understood that these scale normalization methods are presented for the purpose of example, and any other suitable normalization process may be used.

Continuing with FIG. 3, method 300 further comprises normalizing an illumination of the eye image at 312. Illumination normalization may help to enhance the edge contrast between the sclera and the iris, and to make the subsequent iris detection more robust against different lighting conditions. An example of an illumination normalized image is shown in FIG. 4 at 412. Any suitable method may be used to normalize illumination within an image. As one non-limiting example, if scale-normalized eye image 410 is originally a color image, scale-normalized eye image 410 first may be converted to a gray scale image, and then a Gaussian normalization may be used to normalize the image intensity. An example Gaussian normalization technique may be performed by using the following conditional function:

$$I'(x,y) = \begin{cases} 255 & \text{if } I(x,y) \geq \mu + 3\sigma \\ 0 & \text{if } I(x,y) \leq \mu - 3\sigma \\ \left(\frac{I(x,y)-\mu}{\sigma}+3\right)*\frac{255}{6} & \text{otherwise} \end{cases}$$

where I(x,y) is the original pixel intensity at pixel(x,y), µ is the mean intensity of all pixels in the cropped eye image, σ is the standard deviation of all pixel intensities, and I'(x,y) is the normalized pixel intensity. An example of scale-and-illumination-normalized eye image 412 is shown in FIG. 4. In other examples, any other illumination normalization may be used.

To further restrict the search region to help speed up the iris detection and also to help reduce interference from non-relevant areas of the image, method 300 may further comprise, at 314, performing segmentation on the eye image. Segmentation may be used, for example, to mask out the non-eye and/or non-iris regions, as respectively shown at 316 and 318. FIG. 4 shows eye-masked image 414 as an example result of masking out non-eye regions in the image (shown in black), while preserving the eye region (shown in white). Segmentation may be performed using any suitable method. Examples include, but are not limited to, intensity threshold and/or learning-based approaches using texture and color features of the image.

After masking, the iris may be located by finding an ellipse of a plurality of ellipses that has a suitably close fit to the limbus in the eye-masked image, as indicated in FIG. 3 at 320. Fitting the ellipse may comprise, at 322, applying a plurality of ellipse hypotheses. As one non-limiting example, a Hough transform-based ellipse fitting method may be utilized. In this example, a best-fit ellipse may be determined from a set of different hypotheses of the iris ellipse, each hypothesis parameterized by a combination of the rotation angle θ, radius r, and long-short axis ratio t. For each pixel $\vec{p}=(x,y)$ in the eye-mask image, its gradient vector may be denoted as $\vec{g}(p)$. Each ellipse hypothesis may be represented by a voting map V, where voting map V is the same size as the eye-mask image, and each pixel of the voting map corresponds to a corresponding pixel of the eye image. The voting map V for each ellipse hypothesis may be initialized to zero. Next, for each pixel $\vec{p}$ inside the eye-mask image, a positively-affected pixel $\vec{p}_+$ (e.g. where the gradient vector $\vec{g}(p)$ points to) and a negatively-affected pixel $\vec{p}_-$ (e.g. where the gradient vector points away from) may be determined as follows:

$$\vec{p}_+ = \vec{p} + \frac{G \cdot M \cdot G^{-1} \cdot M^{-1} \cdot \vec{g}(p)}{\|G \cdot M \cdot G^{-1} \cdot M^{-1} \cdot \vec{g}(p)\|} r$$

$$\vec{p}_- = \vec{p} - \frac{G \cdot M \cdot G^{-1} \cdot M^{-1} \cdot \vec{g}(p)}{\|G \cdot M \cdot G^{-1} \cdot M^{-1} \cdot \vec{g}(p)\|} r$$

where $M = \begin{bmatrix} 0 & 1 \\ -1 & 0 \end{bmatrix}$ and $G = \begin{bmatrix} \cos\theta & \sin\theta \\ -\sin\theta & \cos\theta \end{bmatrix} \begin{bmatrix} t & 0 \\ 0 & 1 \end{bmatrix}$.

Then, the voting map V is updated at pixel $\vec{p}_+$ and $\vec{p}_-$ with the magnitude of the gradient vector $\vec{g}(p)$ respectively, as follows:

$$V(\vec{p}_+) = V(\vec{p}_+) + \|\vec{g}(p)\|$$

$$V(\vec{p}_-) = V(\vec{p}_-) + \|\vec{g}(p)\|$$

Accordingly, method 300 further comprises, at 324, determining a voting map for each ellipse hypothesis, and at 326, for each pixel determining a gradient vector and updating a value of the voting map.

Figure 5:
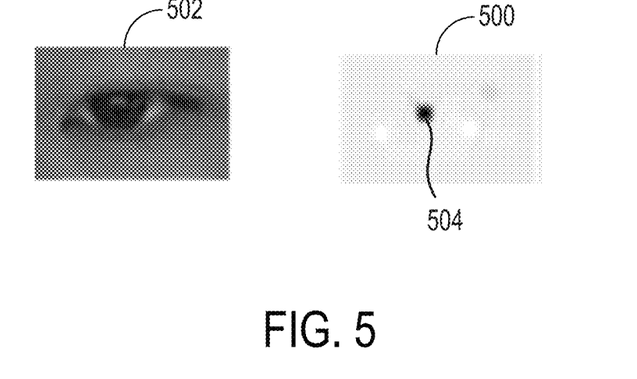
FIG. 5 shows an example eye image and corresponding voting map.

FIG. 5 shows an example voting map 500 for an ellipse hypothesis for eye image 502. Because the iris is darker than other eye structures, the iris center for each ellipse hypothesis may be determined by finding the pixel with a minimum value on the corresponding voting map. In FIG. 5, black pixel 504 is the pixel with the minimum value in voting map 500 and represents the iris center in eye image 502. Accordingly, method 300 further comprises, at 328, determining the center of the iris based upon the values of the voting map. An ellipse considered to have a suitably close fit may be selected via optimization (e.g. minimization) across all the voting maps. Returning to FIG. 4, an example ellipse-fitted eye image 416 is shown, where the white dotted ellipse represents the best-fit ellipse for the iris. It will be understood that, in other examples, an ellipse may be fitted to the pupil in an infrared image of the eye, rather than to the iris, and the pupil center may be determined by finding the pixel with the maximum value across all the voting maps. It will be further understood that such ellipse fitting may be performed using an iris-masked image instead of an eye-masked image, as disclosed herein.

Continuing with FIG. 3, method 300 comprises, at 330, outputting a determination of an eye gaze direction based upon the determined iris center (or pupil center). As disclosed above, determining a direction in which a viewer is gazing may help to identify a location of a display at which a user is looking. The gaze direction may then be used by a computing device for interacting with a user interface and/or other computer-based interactions. In this manner, a user may interact with a computing device via gaze tracking without the use of eye glint light sources. This may help to reduce power consumption compared to the use of eye glint light sources, and may also simplify hardware configurations used for eye tracking, as it may permit eye tracking to be performed with a single visible light camera, such as those commonly available on current computing devices.

Figure 6:
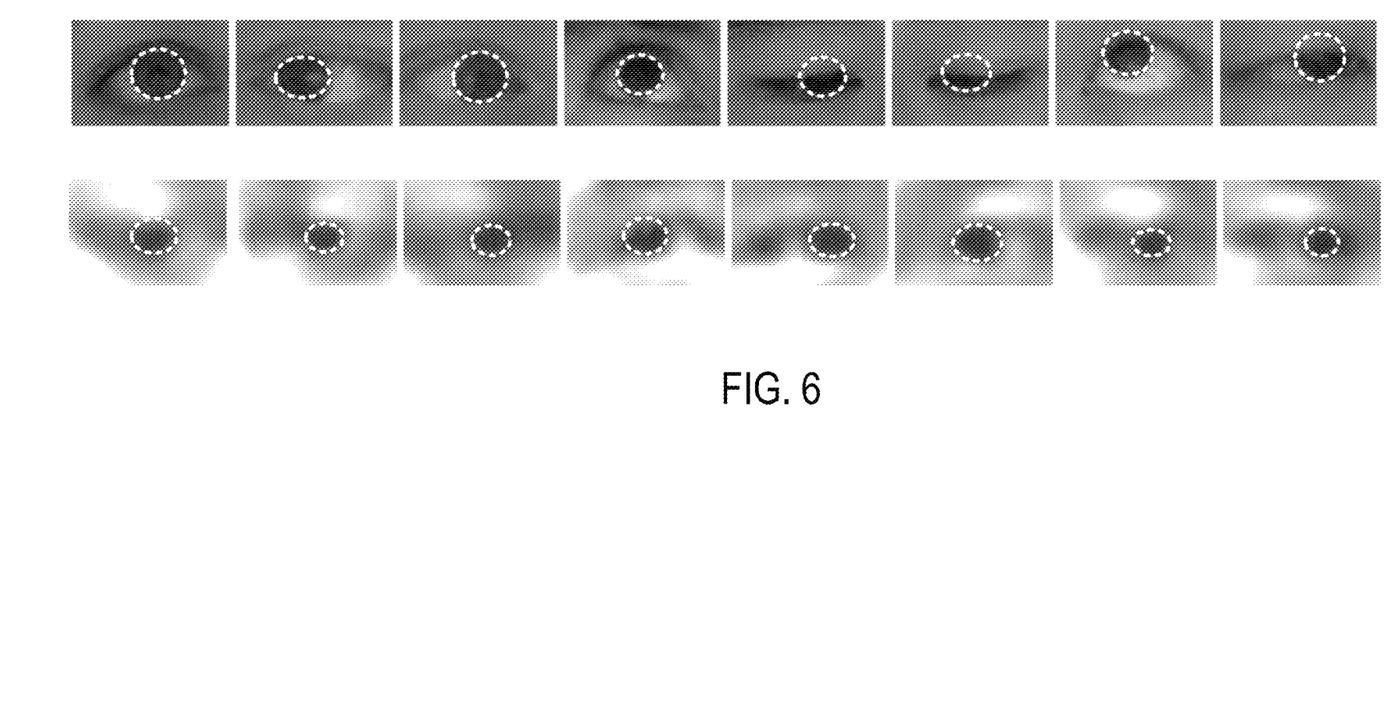
FIG. 6 shows examples of ellipses fit to images of irises.

FIG. 6 depicts examples of ellipses fit to a plurality of eye images in a sample data set. The depicted images show robust results even with varying image conditions, such as where the iris of the eye is in different positions, where the iris was partially or mostly occluded by the eyelid, and where images are blurred and/or have low resolution (e.g. when the user was far away from the image sensor), as shown in the bottom row.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
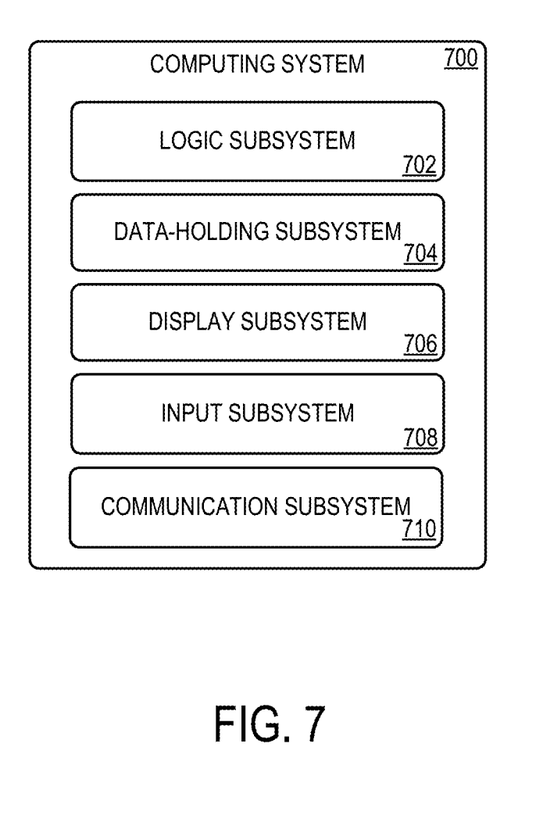
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Eye tracking system 100 is a non-limiting example implementation of computing system 700.

Computing system 700 includes a logic subsystem 702 and a data-holding subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 702 may include one or more processors configured to execute software instructions. Additionally or alternatively, logic subsystem 702 may include one or more hardware or firmware logic machines configured to execute hardware or firmware instructions. Processors of logic subsystem 702 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 702 may be virtualized and executed by remotely accessible, networked computing devices configured in a cloud-computing configuration.

Data-holding subsystem 704 includes one or more physical devices configured to hold instructions executable by the logic machine to implement the methods and processes described herein. When such methods and processes are implemented, the state of data-holding subsystem 704 may be transformed—e.g., to hold different data.

Data-holding subsystem 704 may include removable and/or built-in devices. Data-holding subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-holding subsystem 704 may include volatile, nonvolatile, dynamic, static, read/write, read-only, random-access, sequential-access, location-addressable, file-addressable, and/or content-addressable devices.

It will be appreciated that data-holding subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and data-holding subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by data-holding subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example provides, on a computing device, a method of tracking an eye, the method comprising receiving image data from an image sensor, detecting a face of the user in the image data, locating the eye in a region of the face in the image data to obtain an eye image, normalizing one or more of a scale and an illumination of the eye image, fitting an ellipse to an iris of the eye in the eye image, and outputting a determination of an eye gaze direction based upon the ellipse fitted. In this example, the method may additionally or alternatively include normalizing the scale of the eye image by scaling the eye image to normalize a distance between features in the eye image, and normalizing the illumination of the eye image comprises forming a gray scale image from the eye image and normalizing an intensity of the grayscale image. The method may additionally or alternatively include performing segmentation on the image data to mask out one or more of a non-eye area and a non-iris area of the eye image prior to fitting the ellipse. The method may additionally or alternatively include fitting the ellipse to the iris by applying a plurality of ellipse hypotheses to the image data, and determining for each ellipse hypothesis a voting map corresponding to the eye image. The method may additionally or alternatively include fitting the ellipse by, for each pixel of the eye image, determining a gradient vector for the pixel, and updating a value of a corresponding pixel of the voting map with a magnitude of the gradient vector. The method may additionally or alternatively include fitting the ellipse by determining a center of the iris based upon the value of each pixel of the voting map. The method may additionally or alternatively include wherein each of the plurality of ellipse hypotheses comprises one or more of a rotation angle, a radius, and a long-short axis ratio. Any or all of the above-described examples may be combined in any suitable manner in various implementations.

Another example provides an eye-tracking system comprising an image sensor configured to acquire image data, a logic subsystem, and a storage subsystem comprising instructions stored thereon that are executable by the logic subsystem to detect a face of a user in the image data, locate the eye in a region of the face in the image data to obtain an eye image, normalize one or more of a scale and an illumination of the eye image, determine a voting map for each of a plurality of ellipse hypotheses, fit an ellipse to an iris of the eye in the eye image based upon the voting map of each ellipse hypothesis, and output a determination of a gaze direction based upon the ellipse fitted. The instructions may additionally or alternatively be executable to normalize the scale of the eye image by scaling the eye image to normalize a distance between features in the eye image. The instructions may additionally or alternatively be executable to normalize the illumination of the eye image by forming a gray scale image from the eye image and normalizing an intensity of the grayscale image. The instructions may additionally or alternatively be executable to perform segmentation on the image data to mask out one or more of a non-eye area and a non-iris area of the eye image prior to fitting the ellipse. The instructions may additionally or alternatively be executable to fit the ellipse by, for each pixel of the eye image, determining a gradient vector for the pixel, and, for each voting map, updating a value of a corresponding pixel of the voting map with a magnitude of the gradient vector. The instructions may additionally or alternatively be executable to fit the ellipse by determining a center of the iris based upon the value of each pixel of the voting map. Any or all of the above-described examples may be combined in any suitable manner in various implementations.

Another example provides an eye-tracking system comprising an image sensor configured to acquire image data, a logic subsystem, and a storage subsystem comprising instructions stored thereon that are executable by the logic subsystem to detect a face of a user from the image data, locate the eye in a region of the face from the image data to obtain an eye image, normalize one or more of a scale and an illumination of the eye image, perform segmentation on the image data to mask out one or more of non-eye areas and non-iris areas of the eye image, fit an ellipse to an iris of the eye in the eye image based upon applying a plurality of ellipse hypotheses, and output a determination of a gaze direction based upon the ellipse fitted. The instructions may additionally or alternatively be executable to normalize the scale of the eye image by scaling the eye image to normalize a distance between features in the eye image. The instructions may additionally or alternatively be executable to normalize the illumination of the eye image by forming a gray scale image from the eye image and normalizing an intensity of the grayscale image. The instructions may additionally or alternatively be executable to determine for each ellipse hypothesis a voting map corresponding to the eye image. The instructions may additionally or alternatively be executable to fit the ellipse by, for each pixel of the eye image, determining a gradient vector for the pixel, and updating a value of a corresponding pixel of the voting map with a magnitude of the gradient vector. The instructions may additionally or alternatively be executable to fit the ellipse by determining a center of the iris based upon the value of each pixel of the voting map. Any or all of the above-described examples may be combined in any suitable manner in various implementations.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of tracking an eye, the method comprising:
   receiving image data from an image sensor;
   detecting a face of the user in the image data;
   locating the eye in a region of the face in the image data to obtain an eye image;
   normalizing one or more of a scale and an illumination of the eye image;
   fitting an ellipse to an iris of the eye in the eye image by applying a plurality of ellipse hypotheses to the image data, and determining for each ellipse hypothesis a voting map corresponding to the eye image, wherein fitting the ellipse comprises, for each pixel of the eye image, determining a gradient vector for the pixel, and updating a value of a corresponding pixel of the voting map with a magnitude of the gradient vector; and
   outputting a determination of an eye gaze direction based upon the ellipse fitted.

2. The method of claim 1, wherein normalizing the scale of the eye image comprises scaling the eye image to normalize a distance between features in the eye image.

3. The method of claim 1, wherein normalizing the illumination of the eye image comprises forming a gray scale image from the eye image and normalizing intensity of the grayscale image.

4. The method of claim 1, further comprising performing segmentation on the image data to mask out one or more of a non-eye area and a non-iris area of the eye image prior to fitting the ellipse.

5. The method of claim 1, wherein fitting the ellipse comprises determining a center of the iris based upon the value of each pixel of the voting map.

6. The method of claim 1, wherein each of the plurality of ellipse hypotheses comprises one or more of a rotation angle, a radius, and a long-short axis ratio.

7. An eye-tracking system comprising:
an image sensor configured to acquire image data;
a logic subsystem; and
a storage subsystem comprising instructions stored thereon that are executable by the logic subsystem to:
detect a face of a user in the image data;
locate the eye in a region of the face in the image data to obtain an eye image;
normalize one or more of a scale and an illumination of the eye image, determine a voting map for each of a plurality of ellipse hypotheses;
fit an ellipse to an iris of the eye in the eye image by applying a plurality of ellipse hypotheses to the image data, and determine for each ellipse hypothesis a voting map corresponding to the eye image, wherein the instructions are executable to fit the ellipse by, for each pixel of the eye image, determining a gradient vector for the pixel, and updating a value of a corresponding pixel of the voting map with a magnitude of the gradient vector; and
output a determination of a gaze direction based upon the ellipse fitted.

8. The eye-tracking system of claim 7, wherein the instructions are executable to normalize the scale of the eye image by scaling the eye image to normalize a distance between features in the eye image.

9. The eye-tracking system of claim 7, wherein the instructions are executable to normalize the illumination of the eye image by forming a gray scale image from the eye image and normalizing intensity of the grayscale image.

10. The eye-tracking system of claim 7, wherein the instructions are further executable to perform segmentation on the image data to mask out one or more of a non-eye area and a non-iris area of the eye image prior to fitting the ellipse.

11. The eye-tracking system of claim 7, wherein the instructions are executable to fit the ellipse by determining a center of the iris based upon the value of each pixel of the voting map.

12. An eye-tracking system comprising:
an image sensor configured to acquire image data;
a logic subsystem; and
a storage subsystem comprising instructions stored thereon that are executable by the logic subsystem to:
detect a face of a user from the image data;
locate the eye in a region of the face from the image data to obtain an eye image;
normalize one or more of a scale and an illumination of the eye image, perform segmentation on the image data to mask out one or more of non-eye areas and non-iris areas of the eye image;
fit an ellipse to an iris of the eye in the eye image by applying a plurality of ellipse hypotheses to the image data, and determine for each ellipse hypothesis a voting map corresponding to the eye image, wherein the instructions are executable to fit the ellipse by, for each pixel of the eye image, determining a gradient vector for the pixel, and updating a value of a corresponding pixel of the voting map with a magnitude of the gradient vector; and
output a determination of a gaze direction based upon the ellipse fitted.

13. The eye-tracking system of claim 12, wherein the instructions are executable to normalize the scale of the eye image by scaling the eye image to normalize a distance between features in the eye image.

14. The eye-tracking system of claim 12, wherein the instructions are executable to normalize the illumination of the eye image by forming a gray scale image from the eye image and normalizing intensity of the grayscale image.

15. The eye-tracking system of claim 12, wherein the instructions are executable to fit the ellipse by determining a center of the iris based upon the value of each pixel of the voting map.

* * * * *